(12) United States Patent
Kim et al.

(10) Patent No.: US 9,864,687 B2
(45) Date of Patent: Jan. 9, 2018

(54) CACHE COHERENT SYSTEM INCLUDING MASTER-SIDE FILTER AND DATA PROCESSING SYSTEM INCLUDING SAME

(71) Applicant: SAMSUNG ELECTRONICS CO., LTD., Suwon-si, Gyeonggi-Do (KR)

(72) Inventors: Sik Kim, Seoul (KR); Woo Hyung Chun, Yongin-si (KR); Seong Min Jo, Seoul (KR); Jae Young Hur, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 6 days.

(21) Appl. No.: 15/198,583

(22) Filed: Jun. 30, 2016

(65) Prior Publication Data

US 2017/0004084 A1 Jan. 5, 2017

Related U.S. Application Data

(60) Provisional application No. 62/187,365, filed on Jul. 1, 2015.

(30) Foreign Application Priority Data

Feb. 24, 2016 (KR) .................. 10-2016-0021651

(51) Int. Cl.
*G06F 12/00* (2006.01)
*G06F 12/0831* (2016.01)
*G06F 12/14* (2006.01)
*G06F 13/00* (2006.01)
*G06F 13/28* (2006.01)

(52) U.S. Cl.
CPC ...... *G06F 12/0831* (2013.01); *G06F 12/1433* (2013.01); *G06F 2212/1016* (2013.01); *G06F 2212/1052* (2013.01); *G06F 2212/621* (2013.01)

(58) Field of Classification Search
CPC .......... G06F 12/1433; G06F 2212/621; G06F 2212/1052; G06F 2212/1016
See application file for complete search history.

(56) References Cited

U.S. PATENT DOCUMENTS

| | | | |
|---|---|---|---|
| 5,680,577 A | 10/1997 | Aden et al. | |
| 5,966,729 A * | 10/1999 | Phelps .................. | G06F 9/5016 711/124 |
| 6,842,828 B2 | 1/2005 | Blankenship | |
| 6,862,669 B2 | 3/2005 | Gruner et al. | |
| 7,650,479 B2 | 1/2010 | Kershaw | |
| 8,677,073 B2 | 3/2014 | Blumrich et al. | |
| 8,812,804 B2 | 8/2014 | Goss et al. | |

(Continued)

*Primary Examiner* — Mark Giardino, Jr.
(74) *Attorney, Agent, or Firm* — Volentine & Whitt, PLLC

(57) ABSTRACT

An application processor is provided. The application processor includes a cache coherent interconnect, a first master device connected to the cache coherent interconnect, a second master device, and a master-side filter connected between the cache coherent interconnect and the second master device. The master-side filter receives a snoop request from the first master device through the cache coherent interconnect, compares a second security attribute of the second master device with a first security attribute of the first master device which is included in the snoop request, and determines whether to transmit an address included in the snoop request to the second master device according to a comparison result.

20 Claims, 13 Drawing Sheets

(56) References Cited

U.S. PATENT DOCUMENTS

| | | |
|---|---|---|
| 8,930,638 B2 | 1/2015 | Moll et al. |
| 2002/0019913 A1* | 2/2002 | Shimizu .............. G06F 12/0835 |
| | | 711/141 |
| 2005/0240736 A1* | 10/2005 | Shaw ................... G06F 12/082 |
| | | 711/146 |
| 2011/0153944 A1 | 6/2011 | Kursawe |
| 2014/0115279 A1 | 4/2014 | Chirca et al. |
| 2016/0321179 A1* | 11/2016 | Sara ................... G06F 12/0831 |

* cited by examiner

FIG. 4

TABLE1

| Handler's Mode \ Requestor's Mode | Secure Mode (SM) | Non-Secure Mode (NSM) |
|---|---|---|
| Secure Mode (SM) | Bypass Address | Blocked Address |
| Non-Secure Mode (NSM) | Blocked Address | Bypass Address |

CASE1 : SREQ1 : | SMB | ADD1 | ⇒ Snoop Hit/Cache Hit/Return DATA1

CASE2 : SREQ1 : | SMB | ADD2 | ⇒ Snoop Miss/Cache Miss

CASE3 : SREQ1 : | NSMB | ADD1 | ⇒ Snoop Miss/Cache Miss

FIG. 8

| TABLE2 | | Requestor's Mode | Secure Mode (SM) | | Non-Secure Mode (NSM) | |
|---|---|---|---|---|---|---|
| Handler's Mode | | | Secure Region | Non-Secure Region | Secure Region | Non-Secure Region |
| Secure Mode (SM) | Secure Region | | Snoop Hit | Snoop Miss | Snoop Miss | Snoop Miss |
| | Non-Secure Region | | Snoop Miss | Snoop Hit | Snoop Miss | Snoop Miss |
| Non-Secure Mode (NSM) | Secure Region | | Snoop Miss | Snoop Miss | Snoop Hit | Snoop Miss |
| | Non-Secure Region | | Snoop Miss | Snoop Miss | Snoop Miss | Snoop Hit |

FIG. 9

TABLE3

| SREQ1 : Secure Mode | | SREQ1 : Non-Secure Mode | |
|---|---|---|---|
| Target Address : Secure Region | Target Address : Non-Secure Region | Target Address : Secure Region | Target Address : Non-Secure Region |
| Snoop Hit | Snoop Miss | Snoop Miss | Snoop Hit |

CASE4 : SREQ1 : | SMB | ADD1 | ⇨ Snoop Hit

CASE5 : SREQ1 : | SMB | ADD2 | ⇨ Snoop Miss

AT2 = NSM

CASE6 : SREQ1 : | NSMB | ADD2 | ⇨ Snoop Hit

CASE7 : SREQ1 : | NSMB | ADD1 | ⇨ Snoop Miss

CACHE COHERENT SYSTEM INCLUDING MASTER-SIDE FILTER AND DATA PROCESSING SYSTEM INCLUDING SAME

CROSS-REFERENCE TO RELATED APPLICATIONS

This application claims priority under 35 U.S.C. §119(e) to U.S. Provisional Patent Application No. 62/187,365 filed on Jul. 1, 2015, and under 35 U.S.C. §119(a) to Korean Patent Application No. 10-2016-0021651 filed on Feb. 24, 2016, the collective subject matter of which is hereby incorporated by reference.

BACKGROUND

Embodiments of the inventive concept relate to cache coherent systems, and more particularly, to cache coherent systems including a master-side filter capable of performing a security check. Embodiments of the inventive concept also relate to data processing systems including at least one of cache coherent system including a master-side filter capable of performing a security check.

"Cache coherency" or "cache coherence" is a term used to describe a consistency of data and/or data operation(s) between two or more local caches respectively included in clients (or processors) in a shared memory system. When each of the clients includes its own local cache and multiple clients share one or more memory, the problem of cache coherence may occur as one or more caches associated with one or more clients is updated.

Previously, when a cache coherence problem occurs (or might occur), the shared memory system may perform certain operations to achieve cache coherence or prevent loss of cache coherence. Accordingly, when the shared memory system writes data to a shared memory resource (e.g., a cache), the overall latency of the write operation may increase.

By way of example, it is assumed that a system includes; a cache coherent interface, a central processing unit (CPU) connected to the cache coherent interface, and a graphics processing unit (GPU) connected to the cache coherent interface. It is further assumed that the CPU, operating in a non-secure mode, outputs a snoop request to the GPU and a cache hit occurs for a cache of the GPU. As a result, a cache line (i.e., cache data) stored in the cache may be written back to an external memory device connected to the system. After the write-back operation is completed, the CPU may communicate a command to read the cache line that has been written back to the external memory device to a controller that controls the external memory device. Accordingly, write-back traffic involved in the write-back and memory read request traffic involved in the reading of the cache line stored in the external memory device increases.

SUMMARY

Some embodiments of the inventive concept provide an application processor including a first master device having a first security attribute, a second master device having a second security attribute, and a master-side filter, each respectively interconnected by a cache coherent interconnect, wherein the first master device is configured to communicate a snoop request including a first snoop address and a security attribute indicator indicating the first security attribute, and the master-side filter is configured to execute a snoop operation by receiving the first snoop request from the first master device via the cache coherent interconnect, comparing the second security attribute with the first security attribute as indicated by the snoop request, determining not to communicate the first snoop address to the second master device when the first security attribute and the second security attribute are different, and determining to communicate the first snoop address to the second master device when the first security attribute and the second security attribute are the same.

Some embodiments of the inventive concept provide a data processing system including a controller connected to a main memory device disposed external to the controller, wherein the controller comprises; a first master device having a first security attribute, a second master device having a second security attribute, a master-side filter, and a slave-side filter, each respectively interconnected by a cache coherent interconnect, wherein the first master device is configured to communicate a snoop request including a first snoop address and a security attribute indicator indicating the first security attribute, and the master-side filter is connected between the cache coherent interconnect and the second master device and configured to execute a snoop operation by receiving the first snoop request from the first master device via the cache coherent interconnect, comparing the second security attribute with the first security attribute as indicated by the snoop request, determining not to communicate the first snoop address to the second master device when the first security attribute and the second security attribute are different, and determining to communicate the first snoop address to the second master device when the first security attribute and the second security attribute are the same, and the slave-side filter is connected between the cache coherent interconnect and the main memory device and configured to perform a memory access operation directed to the main memory device in response to a memory access request received from the first master device via the cache coherent interconnect.

Some embodiments of the inventive concept provide a method of operating an application processor including a first master device having a first security attribute, a second master device having a second security attribute, and a master-side filter, each respectively interconnected by a cache coherent interconnect. The method includes; communicating a snoop request including a first snoop address and a security attribute indicator indicating the first security attribute from the first master device to the master-side filter via the cache coherent interconnect, and using the master-side filter to execute a snoop operation in response to the snoop request by comparing the second security attribute with the first security attribute, and communicating the first snoop address to the second master device if the first security attribute and the second security attribute are the same, else communicating a first cache miss to the first master device via the cache coherent interconnect.

Some embodiments of the inventive concept provide a method of operating a data processing system including a requester having a first security attribute indicating either a secure mode or a non-secure mode, a handler having a second security attribute indicating either the secure mode or the non-secure mode, and a master-side filter, each respectively interconnected by a cache coherent interconnect. The method includes; communicating a snoop request from the requester to the handler via the cache coherent interconnect and the master-side filter, wherein the snoop request indicates a target address and either the secure mode or the non-secure mode for at least one of the requester and the handler, determining whether the secure mode for the at least one of the requester and the handler is indicated, upon determining that the secure mode is indicated for the at least one of the requester and the handler, determining whether the target address corresponds to a secure memory region, and if the target address corresponds to a secure memory region, generating a snoop hit, else generating a snoop miss in the master-side filter, and upon determining that the non-secure mode is indicated for the at least one of the requester and the handler, determining whether the target address corresponds to a secure memory region, and if the target address corresponds to a secure memory region, generating a snoop miss, else generating a snoop miss in the master-side filter.

BRIEF DESCRIPTION OF THE DRAWINGS

The above and other features and advantages of the inventive concept will become more apparent by describing in detail exemplary embodiments thereof with reference to the attached drawings in which:

FIG. 4 is a first table listing possible operating relationships between the master-side filter and the second master device illustrated in FIG. 1;

FIG. 5 is a diagram for explaining the operations of the master-side filter responding to a snoop request output from a first master illustrated in FIG. 1 according to some embodiments of the inventive concept;

FIG. 8 is a second table listing possible operating relationships between the master-side filter and the second master device illustrated in FIG. 6;

FIG. 9 is a third table listing possible operating relationships between the master-side filter and the second master device illustrated in FIG. 6;

FIG. 10 is a diagram for explaining the operations of the master-side filter responding to a snoop request output from the first master illustrated in FIG. 1 according to other embodiments of the inventive concept;

DETAILED DESCRIPTION

The inventive concept now will be described more fully hereinafter with reference to the accompanying drawings in which certain embodiments of the inventive concept are shown. This inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
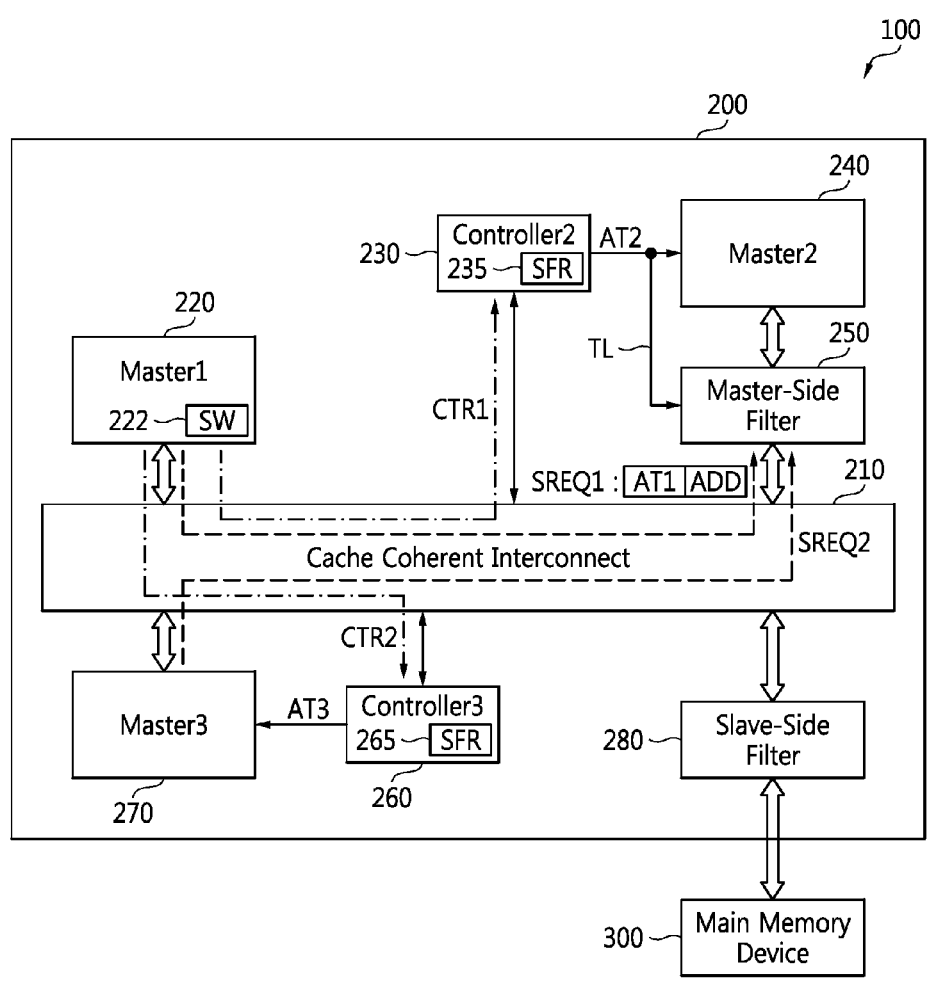
FIG. 1 is a block diagram of a data processing system according to some embodiments of the inventive concept.

FIG. 1 is a block diagram of a data processing system 100 according to some embodiments of the inventive concept. Referring to FIG. 1, the data processing system 100 may include a controller 200 and a main memory device 300.

The data processing system 100 may be implemented as a personal computer (PC) or a mobile device. The mobile device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book. The data processing system 100 may also be used in a smart car or an automotive system.

The controller 200 may control the operation of the main memory device 300. The controller 200 may variously be referred to as a cache coherent system, a cache coherent network, or a cache coherent controller. In certain configurations, the controller 200 may include heterogeneous core clusters, where the heterogeneous core clusters implement, wholly or in part, a central processing unit (CPU), a graphics processing unit (GPU), a general-purpose computing on graphics processing units (GPGPU), and/or a digital signal processor (DSP) connected via a cache coherent interconnect 210.

The controller 200 may be variously implemented as an integrated circuit (IC), a system on chip (SoC), a processor, an application processor, a mobile application processor, a motherboard, a chipset, or a set of semiconductor chips. In certain embodiments, the controller 200 and main memory device 300 may be implemented using a package-on-package (PoP) fabrication technique.

In the illustrated example of FOG. 1, the controller 200 may include a cache coherent interconnect 210, a first master device (Master1) 220, a second controller (e.g., a first security attribute controller) 230, a second master device (Master2) 240, a master-side filter 250, and a slave-side filter 280. In some embodiments, the controller 200 may also include a third controller (e.g., a second security attribute controller) 260 and a third master device (Master3) 270.

As the master-side filter 250 is connected between the cache coherent interconnect 210 and second master device 240 in order to perform (or enforce) a security check. The provision of the master-side filter 250 in this location tends to reduce snoop time or snoop latency. The exemplary system elements (or system components) 220, 230, 250, 260, 270, and 280 may communicate (i.e., transmit and/or receive) various signals with one another via the cache coherent interconnect 210.

The first master device 220 may communicate to the second controller 230 via the cache coherent interconnect 210, a first control signal CTR1 that sets (or defines) an operating mode for the second master device 240. In one example, the operating mode may be set to be either a secure mode or a non-secure mode. Here, the secure mode is used to process "secure data"—or data requiring one or more security procedures be maintain, while the non-secure mode is used to process "non-secure data"—or data requiring either no security procedures or a lesser security procedure than procedure(s) associated with secure data.

The first master device 220 may be implemented as a CPU. For example, the first master device 220 may be a CPU with security awareness capabilities. The first master device 220 may generate a first snoop request SREQ1 including a first security attribute AT1 and a "snoop address" ADD. The first security attribute AT1 may be information (or data) indicating whether the operating mode for the first master device 220 is either the secure mode or the non-secure mode, and the snoop address ADD may point to (or indicate) a location in the main memory device 300 to be accessed by the first master device 220. In this regard, the first master device 220 may execute software (SW) 222 controlling operation (and/or interoperation) of at least one of the other master devices (e.g., the second master 240 or the third master 270).

The second controller 230 may set the operating mode of the second master device 240 to the secure mode or the non-secure mode using (or in response to) the first control signal CTR1 provided by the first master device 220. Control data associated with the first control signal CTR1 may be stored in a register 235 included in the second controller 230. In certain embodiments, the register 235 may be implemented as a special function register (SFR).

A security attribute associated with the second master device 240 (i.e., the second security attribute AT2) may also be determined based on (or in response to) the first control signal CTR1, or some portion of the control data stored in the SFR 235. The second security attribute AT2 may be communicated to the master-side filter 250, for example, via a dedicated transmission line TL. The second security attribute AT2 may be information (or data) indicating whether the operating mode of the second master device 240 is either the secure mode or non-secure mode.

Thus, the operating mode of the second master device 240 may set to the secure mode or non-secure mode based on the second security attribute AT2, as identified by the control data stored in the SFR 235. The second master device 240 may be variously implemented, such as a GPU, GPGPU, DSP, etc. However, in embodiments of the inventive concept, the second master device 240 will be a master including a cache and configured to access the main memory device and/or a cache shared by another master. In this context, the second master device 240 may be a master having non-security awareness or a master lacking security awareness.

As illustrated in FIG. 1, the master-side filter 250 may be connected between the cache coherent interconnect 210 and second master device 240. According to some embodiments of the inventive concept, a master-side filter 250 (or 250-1 of FIG. 6) may be used to perform a security check during a snoop operation or a cache snoop operation. Hence, the master-side filter 250 may be referred to as a master-side security filter.

Since the master-side filter 250 performs a security check during (or in response to) a snoop operation, the data processing system 100 including the master-side filter 250 largely eliminates the requirements associated with write-back traffic and memory read request traffic, as compared with analogous, conventional data processing systems that depend on a security check being performed using the slave-side filter 280 with respect to all snoop hits (or all cache hits).

Accordingly, the master-side filter 250 may (1) receive the first snoop request SREQ1 from the first master device 220, as communicated via the cache coherent interconnect 210, (2) compare the second security attribute AT2 of the second master device 240 with the first security attribute AT1 of the first master device 220 included in the first snoop request SREQ1, and (3) determine whether or not to communicate the snoop address ADD included in the first snoop request SREQ1 to the second master device 240.

When the first security attribute AT1 and second security attribute AT2 are different, the master-side filter 250 will not communicate the snoop address ADD included in the first snoop request SREQ1 to the second master device 240, but instead may communicate (or return) a "cache miss" indication to the first master device 220 via the cache coherent interconnect 210. However, when the first security attribute AT1 and second security attribute AT2 are the same, the master-side filter 250 may communicate the snoop address ADD to the second master device 240.

In response to the receipt of the snoop address ADD, the second master device 240 may (1) determine whether an address matching the snoop address ADD exists in an internal cache of the second master device 240, (2) decide whether a cache miss or a cache hit has occurred based on the address determination result, and (3) communicate the cache hit/miss result to the master-side filter 250.

The master-side filter 250 may perform a primary security check during (or as a part of) the snoop operation. However, the slave-side filter 280 may process a memory access request (e.g., a data read request) for the main memory device 300 without necessarily performing a primary security check during a corresponding snoop operation. For example, a memory access request may be generated by the first master device 220 as the result of a snoop operation (e.g., a cache miss result communicated from the master-side filter 250). Although the data processing system 100 of FIG. 1 includes the slave-side filter 280 and main memory device 300 for purposes of describing possible aspects of system configuration(s) and/or operation(s) contemplated by the inventive concept, only the cache coherent interconnect 210 and master-side filter 250 are required to implement the security-awareness snoop operation described above.

The third controller 260 may be used to set an operating mode for the third master device 270 to either the secure mode or non-secure mode in response to a second control signal CTR2 provided (e.g.) by the first master device 220. The second control signal CTR2 may be stored in a register 265 included in the third controller 260. Each of the control signals CTR1 and CTR2 may be variously implemented, such as in the form of a flag or digital signal having at least one bit.

For example, the register 265 may be implemented as a SFR. A third security attribute AT3 associated with the third master device 270 may be determined according to the second control signal CTR2 stored in the SFR 265. The third security attribute AT3 may be information (or data) indicating whether the operating mode of the third master device 270 is the secure mode or non-secure mode.

Thus, the third master device 270 may set its operating mode to the secure mode or non-secure mode based on the third security attribute AT3 as indicated by data stored in the SFR 265. The third master device 270 may be implemented as a GPU, a GPGPU, or a DSP. For example, the third master device 270 may be a master either having or lacking security awareness. The third master device 270 may generate a second snoop request SREQ2 including the third security attribute AT3 and a corresponding second snoop address.

In this regard, the master-side filter 250 may (1) receive the second snoop request SREQ2 from the third master device 270 via the cache coherent interconnect 210, (2) compare the second security attribute AT2 of the second master device 240 with the third security attribute AT3 of the third master device 270 included in the second snoop request SREQ2, and (3) determine whether or not to communicate the second snoop address to the second master device 240.

For example, when the first security attribute AT1 and third security attribute AT3 are different, the master-side filter 250 may not transmit the second snoop address to the second master device 240, but instead immediately communicate a cache miss to the third master device 270 via the cache coherent interconnect 210. However, when the first security attribute AT1 and third security attribute AT3 are the same, the master-side filter 250 may transmit the second snoop address included in the second snoop request SREQ2 to the second master device 240.

The second master device 240 may then (1) determine whether an address matching the second snoop address communicated from the master-side filter 250 exists in the internal cache of the second master device 240, (2) decide a cache miss or a cache hit according to the address determination result, and (3) send the cache miss/hit result to the master-side filter 250.

The main memory device 300 may be used to store user data or firmware necessary to the operation of the controller 200, and may be implemented using dynamic random access memory (DRAM).

Figure 2:
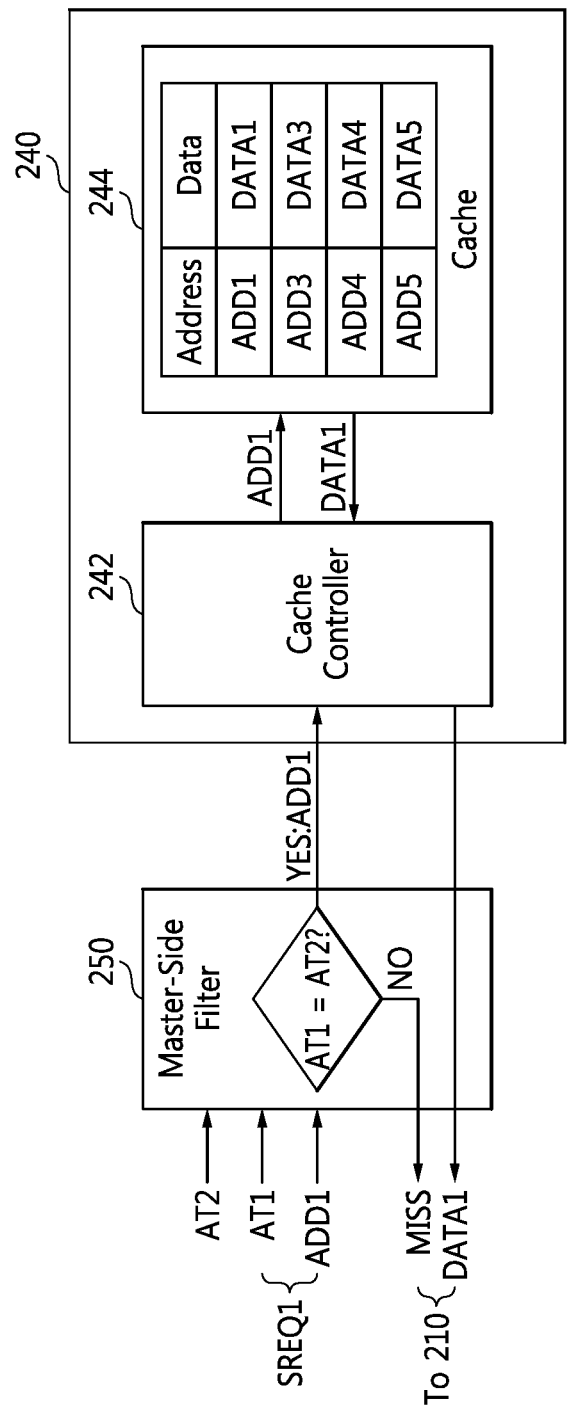
FIG. 2 is a block diagram of a master-side filter and a second master device illustrated in FIG. 1 according to some embodiments of the inventive concept.
Figure 3:
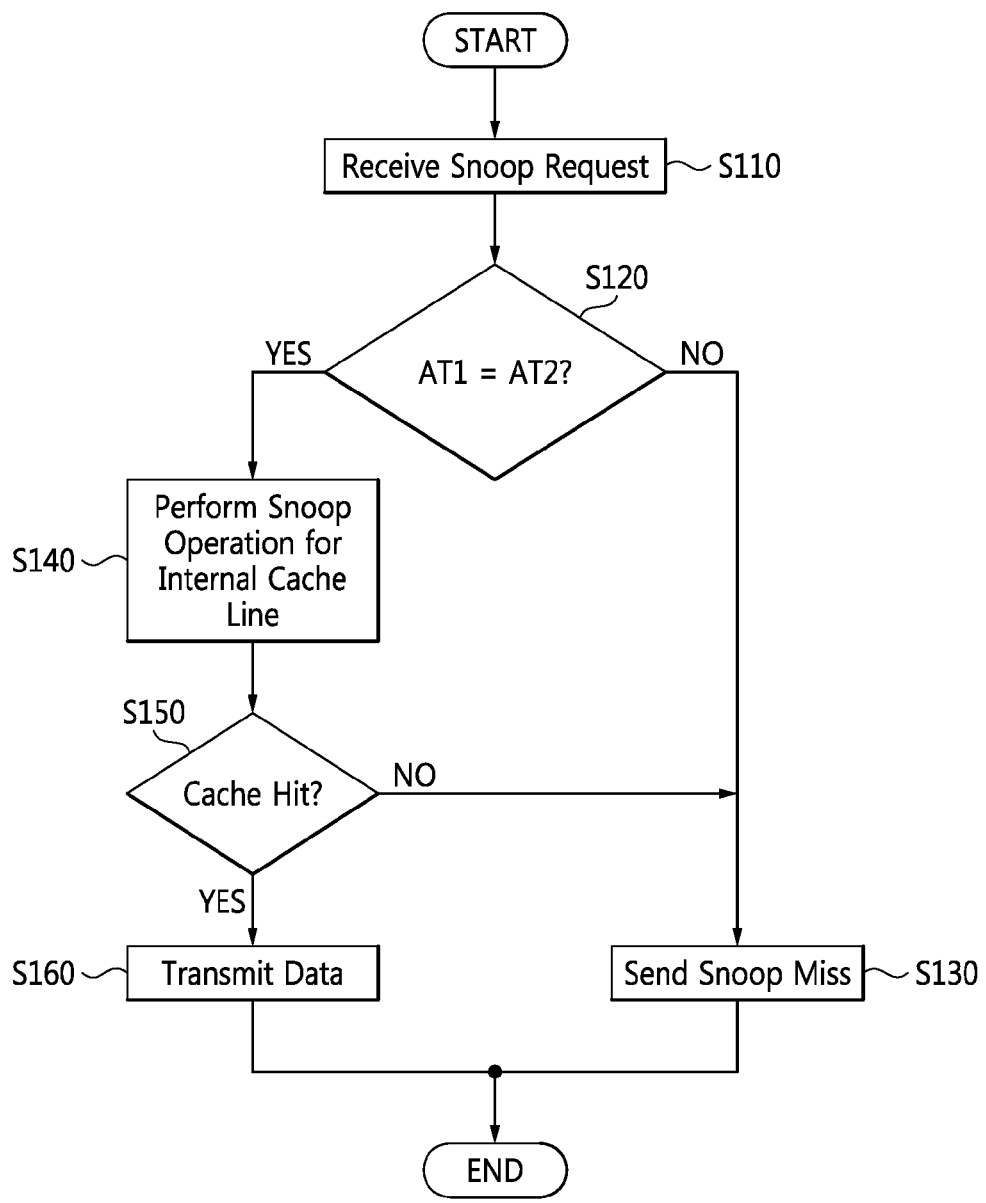
FIG. 3 is a flowchart of the operation of the master-side filter and the second master device illustrated in FIG. 1 according to some embodiments of the inventive concept.

FIG. 2 is a block diagram further illustrating in one example the master-side filter 250 and second master device 240 of FIG. 1. FIG. 3 is a flowchart summarizing in one example the operation of the master-side filter 250 and second master device 240 of FIGS. 1 and 2. FIG. 5 is a diagram illustrating certain exemplary operations for the master-side filter 250 responding to a snoop request received from the first master device 220 of FIG. 1.

It is assumed that the second security attribute AT2 of the second master device 240 indicates the secure mode and a cache 244 included in the second master device 240 stores data DATA1, DATA3, DATA4, and DATA5 respectively corresponding to at least one address (e.g., addresses ADD1, ADD3, ADD4, and ADD5).

Referring collectively to FIGS. 1, 2, 3, and 5, the first master device 220 is assumed to communicate a first snoop request SREQ1 including the first security attribute AT1 and first snoop address ADD1 via the cache coherent interconnect 210 to the master-side filter 250 (S110).

The master-side filter 250 may compare the first security attribute AT1 with a second security attribute AT2 (S120). When the first security attribute AT1 and second security attribute AT2 are different (S120=NO), the master-side filter 250 does not communicate the first snoop address ADD1 to the second master device 240, but instead communicates a snoop miss to one or more elements of the controller 200 via the cache coherent interconnect 210 (S130). Here, the snoop miss may refer to a cache miss.

Referring to the third case (CASE3) shown in FIG. 5, the first snoop request SREQ1 may be assumed to include a third indicator bit NSMB and the first snoop address. The third indicator bit NSMB is further assumed to indicate that the operating mode for the first master device 220 is the non-secure mode and corresponds to the first security attribute AT1. In other words, the first security attribute AT1 of the first master device 220 indicates the non-secure mode.

Since the first security attribute AT1 of the first master device 220 indicates the non-secure mode and the second security attribute AT2 of the second master device 240 indicates the secure mode, the master-side filter 250 will not communicate the first snoop address ADD1 to the second master device 240, but instead will communicate the snoop miss (S130).

When the first security attribute AT1 and the second security attribute AT2 are the same (S120=YES), the master-side filter 250 communicates the first snoop address ADD1 to a cache controller 242 of the second master device 240. The cache controller 242 of the second master device 240 may perform a snoop operation for an internal cache line (S140).

For example, referring to the first case (CASE1) shown in FIG. 5, the first snoop request SREQ1 may include a first indicator bit SMB and the first snoop address ADD1. The first indicator bit SMB indicates that the operating mode of the first master device 220 is the secure mode and corresponds to the first security attribute AT1. In other words, the first security attribute AT1 of the first master device 220 indicates the secure mode.

The cache controller 242 may determine whether an address matching the first snoop address ADD1 exists in the cache 244 (S150). When an address matching the first snoop address ADD1 exists in the cache 244 (i.e., a "snoop hit" or "cache hit" occurs—S150=YES), the cache controller 242 may communicate (or transmit) the data stored in the cache 244 that corresponds to the first snoop address ADD1 (i.e., DATA1 in the example of FIG. 2) to the master-side filter 250 (S160). Thus, the master-side filter 250 may communicate the data DATA1 corresponding to the first snoop address ADD1 to one or more elements of the controller 200 via the cache coherent interconnect 210. For example, the data DATA1 may be communicated from the master-side filter 250 to the first master device 220 via the cache coherent interconnect 210.

Referring now to the second case (CASE2) shown in FIG. 5, the first snoop request SREQ1 may include a second indicator bit SMB and some address other than the first snoop address ADD2 (hereafter, "a second snoop address"). The first security attribute AT1 of the first master device 220 indicates the secure mode.

The cache controller 242 may determine whether an address matching the second snoop address ADD2 exists in the cache 244 (S150). When an address matching the second snoop address ADD2 does not exist in the cache 244 (i.e. a "snoop miss" or "cache miss" occurs—S150=NO), the cache controller 242 may communicate the snoop miss to (e.g.) the master-side filter 250 (S130) and/or first master device 220 via the cache coherent interconnect 210.

When the snoop miss occurs in the second case of FIG. 5, the first master device 220 may generate a memory access request (e.g., a data read request) including the second snoop address ADD2. The memory access request may then be communicated to the slave-side filter 280 via the cache coherent interconnect 210. And in response, the slave-side filter 280 may perform a security check on the memory access request, and then read data from a memory region of the main memory device 300, for example, indicated by the second snoop address ADD2. The data that is thus read may then be communicated to the first master device 220 via the cache coherent interconnect 210.

FIG. 4 is a first table listing exemplary operating relationships that may exist between the master-side filter 250 and second master device 240 of FIG. 1. Referring to FIGS. 1, 2, 3 and 4, when the operating mode of a requester (e.g., one of the first master device 220 or third master device 270) is the same as the operating mode of a handler (e.g., the second master device 240)—that is, when a requestor's security attribute is the same as a handler's security attribute—then the master-side filter 250 will communicate a snoop address corresponding to a snoop request (e.g., SREQ1 or SREQ2) received from the requester to the cache controller 242 and a corresponding "bypass address" is identified.

However, when operating mode of the requester is different from the operating mode of the handler—that is, when the requestor's security attribute is different from the handler's security attribute—then the master-side filter 250 will not communicate a snoop address to the cache controller 242, but instead a snoop miss indication may be immediately communicated to the requester via the cache coherent interconnect 210 and a corresponding "blocked address" is identified.

For example, assuming that the first snoop request SREQ1 is generated by the requestor (e.g., first master 220), two determinations are performed in sequence. First, the master-side filter 250 performs a security check (i.e., a comparison between security attributes AT1 and AT2) in relation to the first snoop request SREQ1 (S120). Second, when no security issue is indicated (i.e., the security attributes AT1 and AT2 are the same—S120=YES), the cache controller 242 of the handler (e.g., second master device 240) determines a cache hit/miss (S150).

Figure 6:
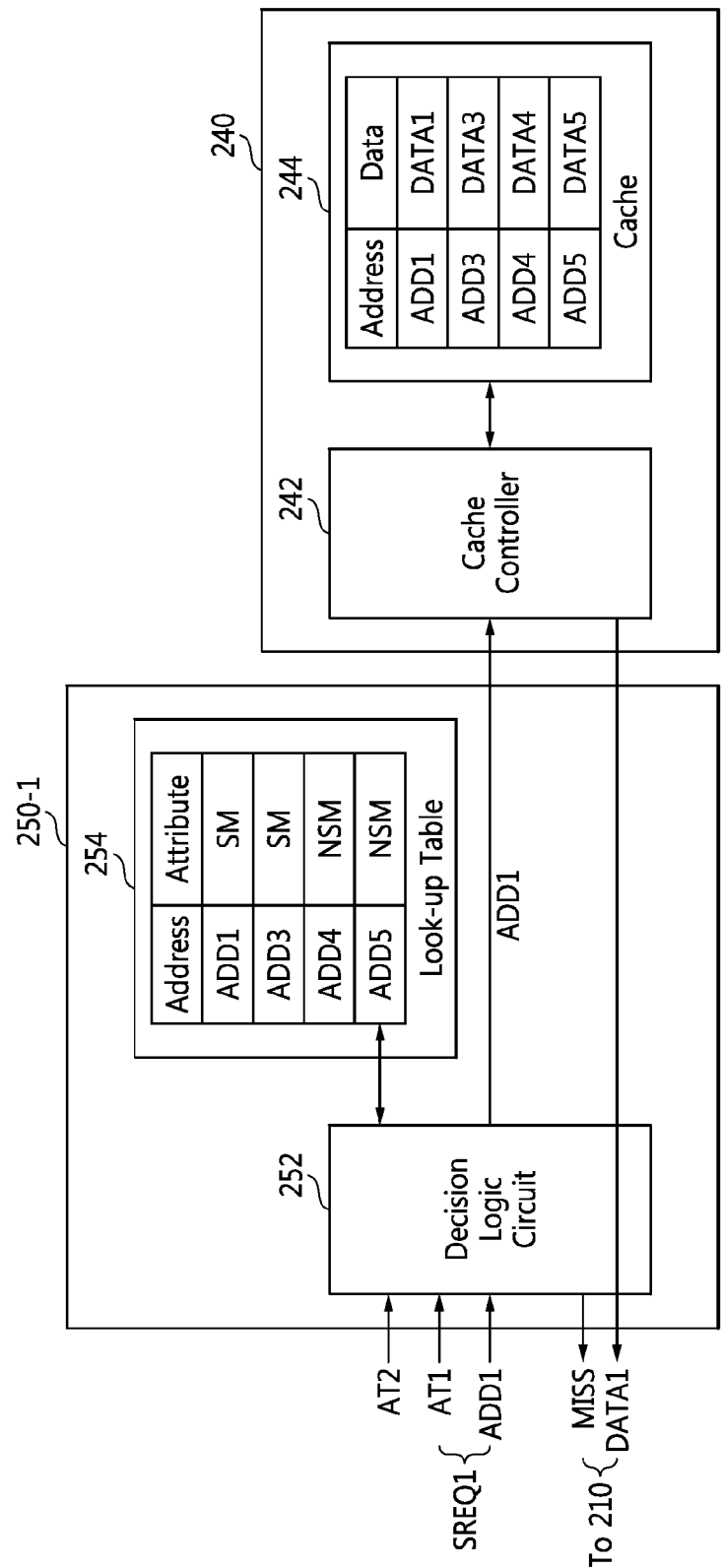
FIG. 6 is a block diagram of the master-side filter and the second master device illustrated in FIG. 1 according to other embodiments of the inventive concept.
Figure 7:
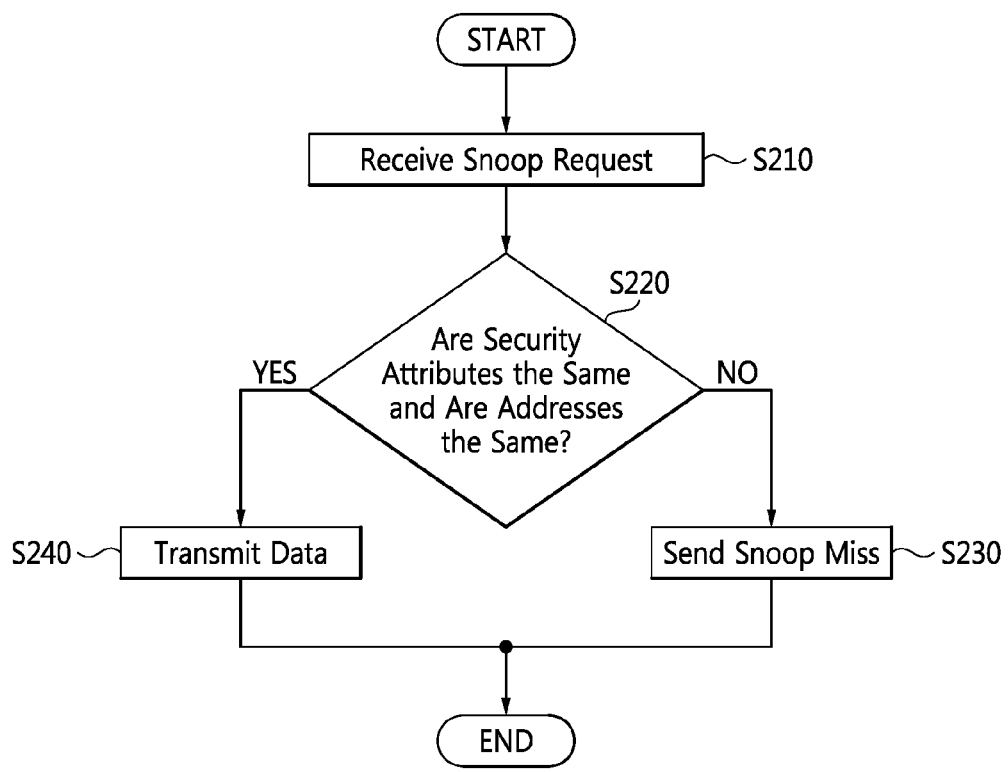
FIG. 7 is a flowchart of the operation of the master-side filter and the second master device illustrated in FIG. 6 according to some embodiments of the inventive concept.

FIG. 6 is a block diagram further illustrating in another example a master-side filter 250-1 and second master device 240 of FIG. 1 and may be compared with FIG. 2. FIG. 7 is a flowchart summarizing in one example the operation of the master-side filter 250-1 and second master device 240 of FIG. 6.

Referring to FIGS. 1, 6, and 7, the master-side filter 250-1 may include a decision logic circuit 252 and a memory device 254 that stores a security attribute lookup table. Although the memory device 254 is shown internal to the master-side filter 250-1 of FIG. 6, it may alternately be implemented external to the master-side filter 250-1 (e.g., elsewhere in the controller 200, such as the second master device 240) in other embodiments. The memory device 254 may be implemented using static random access memory (SRAM).

The memory device 254 may be used to store data (e.g., flag states) indicating a security attribute (e.g., SM or NSM) respectively associated with a "memory region" including (e.g., beginning at) a corresponding address (e.g., ADD1, ADD3, ADD4, and ADD5). Here, each memory region may refer to some designated portion of the main memory device 300 (e.g., a block, page, cache line, etc.).

In the example illustrated in FIG. 6, memory regions corresponding to the respective addresses ADD1 and ADD3 are accessible in the secure mode SM. In other words, these are secure memory regions. In contrast, memory regions corresponding to the respective addresses ADD4 and ADD5 may be accessible in the non-secure mode NSM. In other words, these are non-secure memory regions.

Here, it is assumed that the first master device 220 communicates a first snoop request SREQ1 including the first security attribute AT1 and first snoop address ADD1 via the cache coherent interconnect 210 to the decision logic circuit 252 of the master-side filter 250-1 (S210). The decision logic circuit 252 then compares the first security attribute AT1 and second security attribute AT2 to determine whether an address matching the first snoop address ADD1 exists in the memory device 254 (S220). These two comparisons may be made sequentially or in parallel.

When the first security attribute AT1 and second security attribute AT2 are the same, and a match is identified for the first snoop address in the memory device 254 (S220=YES), the decision logic circuit 252 may communicate the first snoop address ADD1 included in the first snoop request SREQ1 to the second master device 240. The cache controller 242 of the second master device 240 may communicate the data DATA1, which has been stored in the cache 244 and corresponds to the first snoop address ADD1 to the master-side filter 250-1 (S240). The decision logic circuit 252 of the master-side filter 250-1 may communicate the data DATA1 via cache coherent interconnect 210 to the first master device 220, for example.

With reference to a fourth case (CASE4) and a fifth case (CASE5) shown in FIG. 10, it is assumed that the second security attribute AT2 of the second master device 240 indicates that the operating mode for the second master device 240 is the secure mode (SMB).

Referring to the fourth case, the first snoop request SREQ1 includes a fourth indicator bit SMB and the first snoop address ADD1. The fourth indicator bit SMB indicates that the operating mode of the first master device 220 is the secure mode and corresponds to the first security attribute AT1. Accordingly, a memory region corresponding to the first snoop address ADD1 is a secure memory region accessible in the secure mode SM.

Since the first security attribute AT1 of the first master device 220 indicates the secure mode, the second security attribute AT2 of the second master device 240 indicates the secure mode, the memory region corresponding to the first snoop address ADD1 is the secure memory region, and the memory region corresponding to the first snoop address ADD1 stored in the memory device 254 is the secure memory region—the decision logic circuit 252 may communicate the first snoop address ADD1 included in the first snoop request SREQ1 to the cache controller 242 of the second master device 240 (S220=YES). A corresponding cache hit (or snoop hit) is generated by the operation of the cache controller 242 (e.g., operation S240).

Referring to the fifth case, the first snoop request SREQ1 includes a fifth indicator bit SMB and a second snoop address ADD2. The fifth indicator bit SMB indicates that the operating mode for the first master device 220 is the secure mode and corresponds to the first security attribute AT1. Accordingly, a memory region corresponding to the second snoop address ADD2 is a non-secure memory region accessible in the non-secure mode.

The first security attribute AT1 indicating the secure mode is the same as the second security attribute AT2 indicating the secure mode. Since the first security attribute AT1 of the first master device 220 indicates the secure mode, the first master device 220 is supposed to output an address enabling access to a secure memory region. However, even though the first security attribute AT1 of the first master device 220 indicates the secure mode, the second snoop address ADD2 to be accessed by the first master device 220 indicates a non-secure memory region (hence, S220=NO). Accordingly, the decision logic circuit 252 does not communicate the second snoop address ADD2 to the cache controller 242 of the second master device 240, but instead, immediately communicates a snoop miss to one or more elements of the controller 200 via the cache coherent interconnect 210 (S230).

With reference to a sixth case (CASE6) and a seventh case (CASE7) also shown in FIG. 10, it is assumed that the second security attribute AT2 of the second master device 240 indicates the non-secure mode (NSMB).

Referring to the sixth case, the first snoop request SREQ1 includes a sixth indicator bit NSMB and the second snoop address ADD2. The sixth indicator bit NSMB indicates that the operating mode of the first master device 220 is the non-secure mode and corresponds to the first security attribute AT1.

The first security attribute AT1 indicating the non-secure mode is the same as the second security attribute AT2 indicating the non-secure mode. In addition, the second snoop address ADD2 included in the first snoop request SREQ1 points to a non-secure memory region and the second address ADD2 stored in the memory device 254 points to the non-secure memory region. Accordingly, the attribute of the second snoop address ADD2 included in the first snoop request SREQ1 is the same as the attribute of the second address ADD2 stored in the memory device 254.

The decision logic circuit 252 may communicate the second snoop address ADD2 included in the first snoop request SREQ1 to the cache controller 242 of the second master device 240. In other words a cache hit (or snoop hit) is generated according to the operation of the cache controller 242.

Referring to the seventh case, the first snoop request SREQ1 includes a seventh indicator bit NSMB and the first snoop address ADD1. The seventh indicator bit NSMB indicates that the operation mode of the first master device 220 is the non-secure mode and represents the first security attribute AT1.

The first security attribute AT1 indicating the non-secure mode is the same as the second security attribute AT2 indicating the non-secure mode. The first security attribute AT1 included in the first snoop request SREQ1 indicates the non-secure mode and the first snoop address ADD1 included in the first snoop request SREQ1 points to the non-secure memory region, but the first address ADD1 stored in the memory device 254 points to the secure memory region. Accordingly, the attribute of the first snoop address ADD1 included in the first snoop request SREQ1 is different from the attribute of the first address ADD1 stored in the memory device 254 (hence, S220=NO). The decision logic circuit 252 does not communicate the first snoop address ADD1 included in the first snoop request SREQ1 to the cache controller 242 of the second master device 240, but instead, communicates a snoop miss via the cache coherent interconnect 210 (S230).

FIG. 8 is a second table TABLE2 listing possible operating relationships between the master-side filter 250-1 and second master device 240 of FIG. 6. Referring to FIGS. 6, 7 and 8, when the operating mode of the requester 220 is the same as the operating mode of the handler 240 and an address corresponding to a snoop address included in the first snoop request SREQ1 exists in the memory device 254, a snoop hit is generated. The snoop hit may cause the cache controller 242 to communicate data corresponding to the address to one or more elements of the controller 200.

For example, when the operating mode of the requester 220 is the secure mode SM, the first snoop address ADD1 included in the first snoop request SREQ1 indicates a secure memory region, the operating mode of the handler 240 is the secure mode, and an address matching the first snoop address ADD1 is stored in the memory device 254 and points to the secure memory region, a snoop hit is generated.

However, when the operating mode of the requester 220 is the secure mode SM, the first snoop address ADD1 included in the first snoop request SREQ1 indicates the secure memory region, the operating mode of the handler 240 is the secure mode, and an address matching the first snoop address ADD1 is stored in the memory device 254 but indicates a non-secure memory region, a snoop miss is generated. And when the snoop miss is generated, the decision logic circuit 252 may block communication of the first snoop address ADD1 included in the first snoop request SREQ1 to the second master device 240. In other words, the decision logic circuit 252 will not communicate the first snoop address ADD1 included in the first snoop request SREQ1 to the second master device 240.

In some embodiments, the decision logic circuit 252 may determine whether the security attribute of the requester 220 is the same as the security attribute of the handler 240 and may also determine whether an address matching ("matching address") a first snoop address ADD1 included in the first snoop request SREQ1 communicated from the requester 220 exists in the memory device 254 and communicate the first snoop address ADD1 to the second master device 240 or not according to the determination result.

In this regard, the decision logic circuit 252 does not consider whether the security attribute of the first snoop address ADD1 is the same as the security attribute of the matching address. In other words, when the security attribute of the requester 220 is the same as the security attribute of the handler 240 and the address matching the first snoop address ADD1 included in the first snoop request SREQ1 communicated from the requester 220 exists in the memory device 254, the decision logic circuit 252 communicates the first snoop address ADD1 to the second master device 240.

In other embodiments, the decision logic circuit 252 may determine whether the security attribute of the requester 220 is the same as the security attribute of the handler 240, and whether the security attribute of the first snoop address ADD1 is the same as the security attribute of a matching address stored in the memory device 254. And only when both conditions are met, will the decision logic circuit 252 communicate the first snoop address ADD1 to the second master device 240. Here, the security attribute of an address (snoop and/or matching) may be information or data indicating whether a memory region corresponding to the address is a secure memory region or a non-secure memory region.

FIG. 9 is a third table TABLE3 listing possible operating relationships that may exist between the master-side filter 250-1 and second master device 240 of FIG. 6. Referring to FIGS. 6, 7, and 9, when the second security attribute AT2 indicates the secure mode, and a matching address stored in the memory device 254 indicates the secure memory region, the first security attribute AT1 included in the first snoop request SREQ1 indicates the secure mode, and the first snoop address ADD included in the first snoop request SREQ1 indicates the secure memory region, a snoop hit is generated. Here, it is assumed that the first snoop address ADD1 is the same as the matching address.

However, when the second security attribute AT2 indicates the secure mode, the address stored in the memory device 254 indicates the secure memory region, the first security attribute AT1 included in the first snoop request SREQ1 indicates the secure mode, and the first snoop address ADD1 included in the first snoop request SREQ1 points to the non-secure memory region, a snoop miss is generated.

When the second security attribute AT2 indicates the non-secure mode, the second address stored in the memory device 254 points to the non-secure memory region, the first security attribute AT1 included in the first snoop request SREQ1 indicates the non-secure mode, and the first snoop address ADD1 included in the first snoop request SREQ1 indicates the non-secure memory region, a snoop hit is generated. Here again, it is assumed that the first snoop address ADD1 is the same as the matching address.

However, when the second security attribute AT2 indicates the non-secure mode, the matching address stored in the memory device 254 indicates the non-secure memory region, the first security attribute AT1 included in the first snoop request SREQ1 indicates the non-secure mode, and the first snoop address ADD1 included in the first snoop request SREQ1 indicates the secure memory region, a snoop miss is generated.

The embodiments associated with TABLE2 of FIG. 8 relate to a method that considers security attributes for the requester 220 and handler 240, as well as the security attribute of a memory region indicated by an address, whereas the embodiments associated with TABLE3 of FIG. 9 relate to a method that considers the security attribute of the requester 220 as sell as the security attribute of memory region(s) indicated by address(es).

Figure 12:
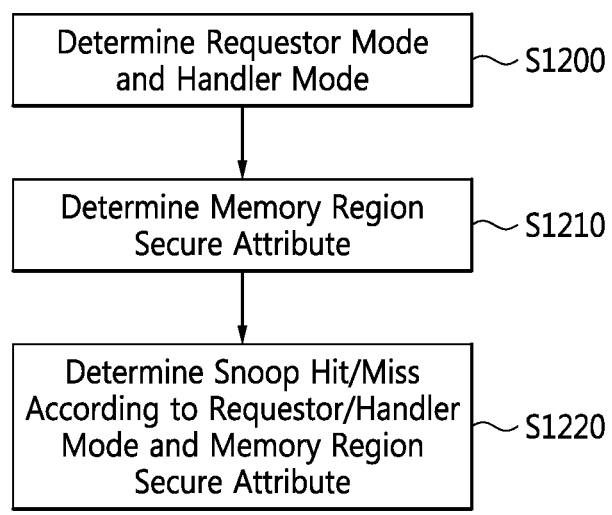
FIG. 12 is a flowchart summarizing methods like the one described in relation to FIG. 8.

FIG. 12 is a flowchart summarizing methods like the one previously described in relation to FIG. 8. Here, a first determination of requester mode and handler mode is made (S1200). Then, a second determination of the secure or non-secure nature of a target region (i.e., the memory region indicated by a snoop address or a matching address stored in a cache) is made (S1210). Then, based on both of these two previous determinations (S1200 and S1210), a snoop hit/miss determination us made (S1220).

Thus, the snoop hit/miss determinations may be variously ascribed between requester, handlers, and memory regions so long as the operating mode for each requester and handler, as well as the secure/non-secure nature of the target memory region are considered.

Figure 13:
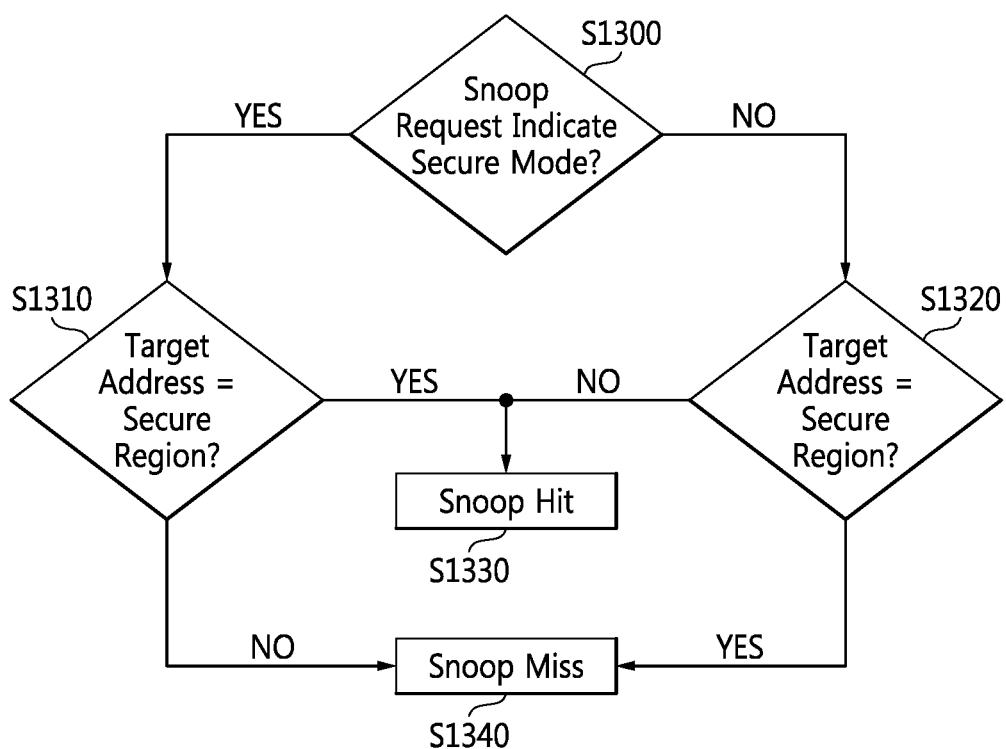
FIG. 13 is a flowchart summarizing methods like the one described in relation to FIG. 9.

By way of comparison with the method of FIG. 12, FIG. 13 is a flowchart summarizing methods like the one previously described in relation to FIG. 9. Here, the operating mode of both requester and handler need not be considered. Instead, a current snoop request is considered and a determination is made as to whether it indicates a secure or non-secure operating mode (e.g., by consideration of data indicating a security attribute) (S1300). If a secure mode is indicated by the snoop request (S1300=YES), then a secondary determination is made as to whether a corresponding address (e.g., a snoop address) indicates a secure memory region (S1310). If the target address indicates a secure memory region, then a snoop hit is generated (S1330), else a snoop miss is generated (S1340).

However, if a non-secure mode is indicated by the snoop request (S1300=NO), then the secondary determination is made as to whether a corresponding address (e.g., a snoop address) indicates a secure memory region (S1320). If the target address indicates a secure memory region, then a snoop miss is generated (S1340), else a snoop hit is generated (S1330).

The foregoing example methods and outcome tables illustrate how operating modes for various elements of the controller 200 of FIG. 1, provided snoop addresses and associated security attributes, and target memory regions and associated security attributes may be differently considered to indicate snoop miss/hit outcomes that vary in specificity and constituent nature.

Figure 11:
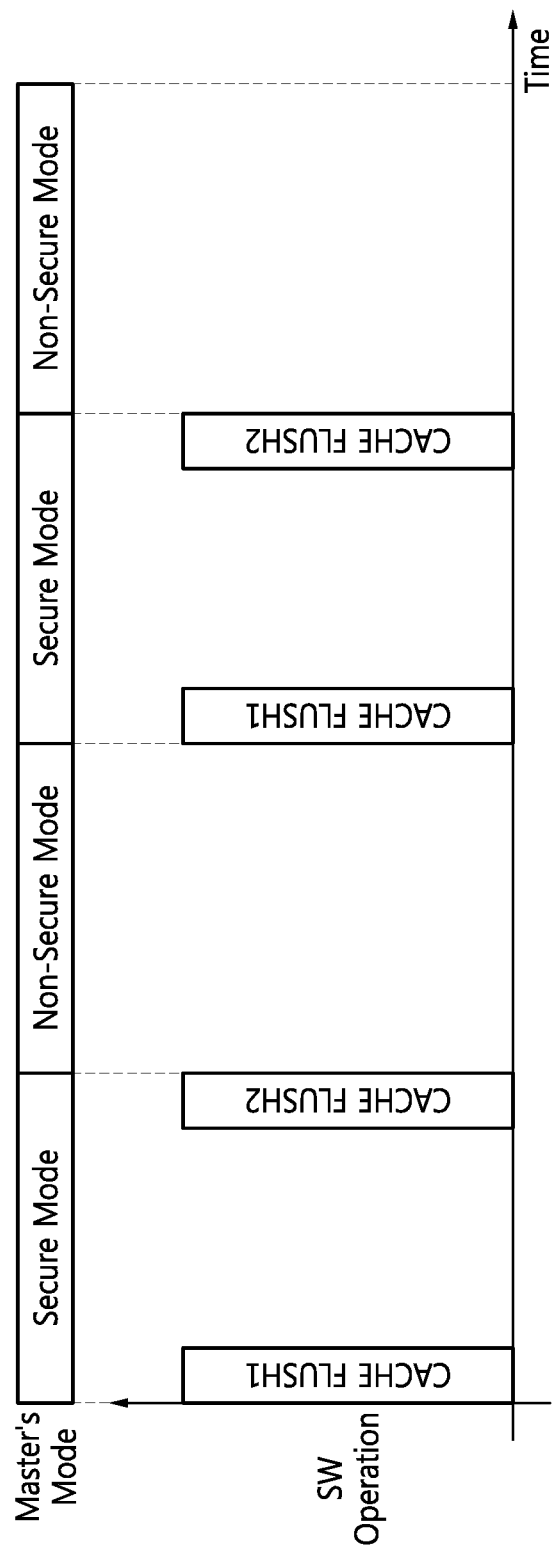
FIG. 11 is a conceptual diagram of the operation modes of the second master device illustrated in FIG. 1 and the software operation in each of the operation modes.

FIG. 11 is a conceptual diagram illustrating operating modes for one or more elements of the controller 200 of FIG. 1 in relation to a firmware execution (a "switching" or "SW" operation) in each of the secure and non-secure operating modes. Referring to FIGS. 1 and 11, the first master device 220 may execute SW to operate in the secure mode. The SW executed by the first master device 220 may control the operation of the second master device 240.

The first master device 220 may communicate to the second controller 230 the first control signal CTR1 for setting the operating mode of the second master device 240 to the secure mode. The second controller 230 may set the first control signal CTR1 in the SFR 235. The second security attribute AT2 indicates the secure mode according to the first control signal CTR1 set in the SFR 235.

The SW may control the cache controller 242 to delete all data from the cache 244. When all data is deleted from the cache 244 (CACHE FLUSH1), the second master device 240 may operate in the secure mode according to the control of the SW. While the second master device 240 is operating in the secure mode, data may be stored in the cache 244.

Thereafter, the first master device 220 may send the second controller 230 the first control signal CTR1 for setting the operation mode of the second master device 240 to the non-secure mode. The second controller 230 may set the first control signal CTR1 in the SFR 235. The second security attribute AT2 indicates the non-secure mode according to the first control signal CTR1 set in the SFR 235.

The SW may control the cache controller 242 to delete all data that has been stored in the cache 244 while the second master device 240 has been operating in the secure mode. When all data is deleted from the cache 244 (CACHE FLUSH2), the second master device 240 may operate in the non-secure mode according to the control of the SW. Since all data stored in the cache 244 during the secure mode is deleted before or right before the second master device 240 starts to operate in the non-secure mode, the security of the controller 200 is enhanced.

In other words, the cache flush operations CACHE FLUSH1 and CACHE FLUSH2 may be performed at the entrance and the exit, respectively, of the secure mode. As a result, all data stored in the cache 244 is deleted.

For example, when a security attribute is not supported for each address or each cache line in the cache 244, or when the security attribute cannot be identified, all data stored in the cache 244 may be deleted as described above. However, when a security attribute is supported for each address or each cache line in the cache 244, or when the security attribute can be identified, all data stored in the cache 244 need not be deleted.

As has been described with reference to FIGS. 1 through 11, the master-side filter 250 may be implemented in the controller 200 for snoop control and a snoop operation (or a primary security check during the snoop operation) is performed by the master-side filter 250 instead of the slave-side filter 280. Therefore, access to the slave-side filter 280 need not be required for the snoop operation (or the primary security check in the snoop operation).

Snoop time or snoop latency may be determined based on only a signal transferred between the first master device 220 and the second master device 240. As a result, timing overhead for the snoop operation in the controller 200 including the master-side filter 250 is eliminated.

As described above, according to some embodiments of the inventive concept, an application processor or a cache coherent system including a master-side filter eliminates write-back traffic and memory read request traffic for a security check in a snoop operation in a data processing system supporting a secure mode and a non-secure mode. The master-side filter manages full cache coherency.

When the application processor or the cache coherent system includes a master device which has an internal cache in a cache coherent network, the overhead of the application processor or the cache coherent system is reduced or eliminated. The application processor or the cache coherent system including the master-side filter does not require a change or a modification in hardware for a cache coherent interconnect. In addition, the application processor or the cache coherent system including the master-side filter does not require a change in hardware for a master device having non-security awareness or non-trust awareness.

As compare to conventional solutions, the application processor or the cache coherent system including the master-side filter according to some embodiments of the inventive concept eliminates timing overhead for the cache coherent network. Since the application processor or the cache coherent system executes SW for conversion (or switching) between the secure mode and the non-secure mode, area overhead for a logic decision circuit is reduce or minimized.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An application processor comprising:
   a first master device having a first security attribute, a second master device having a second security attribute, and a master-side filter, each respectively interconnected by a cache coherent interconnect,
   wherein the first master device is configured to communicate a snoop request including a first snoop address and a security attribute indicator indicating the first security attribute, and
   the master-side filter is configured to execute a snoop operation by receiving the first snoop request from the first master device via the cache coherent interconnect, comparing the second security attribute with the first security attribute as indicated by the snoop request, determining not to communicate the first snoop address to the second master device when the first security attribute and the second security attribute are different, and determining to communicate the first snoop address to the second master device when the first security attribute and the second security attribute are the same.

2. The application processor of claim 1, wherein the first security attribute indicates either a secure mode or a non-secure mode for the first master device, and
   the second security attribute indicates either the secure mode or the non-secure mode for the second master device.

3. The application processor of claim 2, wherein upon determining not to communicate the first snoop address to the second master device, the master-side filter is further configured to communicate a first cache miss to the first master device via the cache coherent interconnect.

4. The application processor of claim 3, wherein the second master device comprises:
   a cache configured to store at least one address and data respectively corresponding to each one of the at least one address; and
   a cache controller configured to compare each one of the at least one address with the first snoop address when communicated from the master-side filter, and upon identifying a matching address for the first snoop address among the at least one address, communicating data corresponding to the matching address to the master-side filter, else communicating a second cache miss to the master-side filter.

5. The application processor of claim 4, wherein the master-side filter is further configured to communicate one of the first cache miss, the corresponding data, or the second cache miss to the first master device via the cache coherent interconnect.

6. The application processor of claim 2, wherein the first master device is further configured to control operation of the second master device such that all secure data stored in a cache of second master device during secure mode operation is deleted when the second master device exits the secure mode and enters the non-secure mode.

7. The application processor of claim 1, further comprising:
   a controller configured to determine the second security attribute in response to a control signal communicated from the first master device, wherein the controller is configured to communicate the second security attribute to the master-side filter using a dedicated transmission line.

8. The application processor of claim 1, wherein the master-side filter comprises:
   a memory device configured to store the at least one address and for each one of the at least one address a corresponding memory region; and
   a decision logic circuit connected to the memory device and configured to compare the first security attribute and the second security attribute, and to compare the first snoop address with each one of the at least one address.

9. The application processor of claim 8, wherein upon determining that the first security attribute is the same as the second security attribute and upon determining that the first snoop address is the same as a matching address among the at least one address, the decision logic circuit is further configured to communicate the first snoop address to the second master device, and upon determining that the first security attribute is different from the second security attribute or upon determining that the first snoop address is different from each one of the at least one address, the decision logic circuit is further configured to communicate a cache miss to the first master via the cache coherent interconnect.

10. The application processor of claim 8, wherein the memory device is further configured to store for each memory region a corresponding security attribute;

the decision logic circuit is further configured to determine whether the first security attribute is the same as the second security attribute, and whether a first security attribute corresponding to a memory region indicated by the first snoop address is the same as a second security attribute corresponding to a memory region indicated by a matching address among the at least one address, and the decision logic circuit only determines to communicate the first snoop address to the second master device if the first security attribute is the same as the second security attribute.

11. The application processor of claim 1, further comprising a slave-side filter connected to the cache coherent interconnect and configured to access a main memory device in response to a memory access request received from the first master device, wherein the slave-side filter cannot perform the snoop operation executed by the master-side filter.

12. The application processor of claim 1, wherein the first master device is a central processing circuit (CPU), and the second master device is one of a graphics processing unit (GPU), a general-purpose computing on graphics processing unit (GPGPU), and a digital signal processor (DSP).

13. A data processing system comprising:

a controller connected to a main memory device disposed external to the controller, wherein the controller comprises; a first master device having a first security attribute, a second master device having a second security attribute, a master-side filter, and a slave-side filter, each respectively interconnected by a cache coherent interconnect, wherein the first master device is configured to communicate a snoop request including a first snoop address and a security attribute indicator indicating the first security attribute, and the master-side filter is connected between the cache coherent interconnect and the second master device and configured to execute a snoop operation by receiving the first snoop request from the first master device via the cache coherent interconnect, comparing the second security attribute with the first security attribute as indicated by the snoop request, determining not to communicate the first snoop address to the second master device when the first security attribute and the second security attribute are different, and determining to communicate the first snoop address to the second master device when the first security attribute and the second security attribute are the same, and the slave-side filter is connected between the cache coherent interconnect and the main memory device and configured to perform a memory access operation directed to the main memory device in response to a memory access request received from the first master device via the cache coherent interconnect.

14. The data processing system of claim 13, wherein the first security attribute indicates either a secure mode or a non-secure mode for the first master device, the second security attribute indicates either the secure mode or the non-secure mode for the second master device, and upon determining not to communicate the first snoop address to the second master device, the master-side filter is further configured to communicate a first cache miss to the first master device via the cache coherent interconnect.

15. The data processing system claim 14, wherein the second master device comprises:

a cache configured to store at least one address and data respectively corresponding to each one of the at least one address; and a cache controller configured to compare each one of the at least one address with the first snoop address when communicated from the master-side filter, and upon identifying a matching address for the first snoop address among the at least one address, communicating data corresponding to the matching address to the master-side filter, else communicating a second cache miss to the master-side filter.

16. The data processing system of claim 15, wherein the master-side filter is further configured to communicate one of the first cache miss, the corresponding data, or the second cache miss to the first master device via the cache coherent interconnect.

17. The data processing system of claim 14, wherein the first master device is further configured to control operation of the second master device such that all secure data stored in a cache of second master device during secure mode operation is deleted when the second master device exits the secure mode and enters the non-secure mode.

18. The data processing system of claim 13, further comprising:

a controller configured to determine the second security attribute in response to a control signal communicated from the first master device, wherein the controller is configured to communicate the second security attribute to the master-side filter using a dedicated transmission line.

19. The data processing system of claim 13, wherein the master-side filter comprises:

a memory device configured to store the at least one address and for each one of the at least one address a corresponding memory region; and a decision logic circuit connected to the memory device and configured to compare the first security attribute and the second security attribute, and to compare the first snoop address with each one of the at least one address.

20. A method of operating an application processor including a first master device having a first security attribute, a second master device having a second security attribute, and a master-side filter, each respectively interconnected by a cache coherent interconnect, the method comprising:

communicating a snoop request including a first snoop address and a security attribute indicator indicating the first security attribute from the first master device to the master-side filter via the cache coherent interconnect, and using the master-side filter to execute a snoop operation in response to the snoop request by:
  comparing the second security attribute with the first security attribute, and
  communicating the first snoop address to the second master device if the first security attribute and the second security attribute are the same, else communicating a first cache miss to the first master device via the cache coherent interconnect.

* * * * *